United States Patent
Shelbo et al.

(10) Patent No.: US 7,731,271 B2
(45) Date of Patent: Jun. 8, 2010

(54) VEHICLE BED EDGE CONSTRUCTION AND MANUFACTURING PROCESS THEREFOR

(75) Inventors: David Shelbo, Troy, MI (US); Joe Jurica, Clinton Township, MI (US); Greg Taylor, Richester Hills, MI (US)

(73) Assignee: Noble Advanced Technologies, Inc., Warren, MI (US)

(*) Notice: Subject to any disclaimer, the term of this patent is extended or adjusted under 35 U.S.C. 154(b) by 244 days.

(21) Appl. No.: 11/977,807

(22) Filed: Oct. 26, 2007

(65) Prior Publication Data

US 2008/0150322 A1 Jun. 26, 2008

Related U.S. Application Data

(60) Provisional application No. 60/876,686, filed on Dec. 22, 2006.

(51) Int. Cl.
*B62D 33/02* (2006.01)
(52) U.S. Cl. .............. 296/183.1; 296/182.1; 296/193.07
(58) Field of Classification Search .............. 296/183.1, 296/183.2, 182.1, 184.1, 193.04, 193.07
See application file for complete search history.

(56) References Cited

U.S. PATENT DOCUMENTS

| 1,085,431 A | 1/1914 | Kane |
| 1,462,474 A | 7/1923 | Atkinson |
| 1,469,321 A | 10/1923 | Kramer |
| 1,508,566 A | 9/1924 | Moffat |
| 1,771,028 A | 7/1930 | Bronson et al. |
| 1,806,428 A | 5/1931 | Travis, Jr. |
| 2,073,058 A | 3/1937 | Greene |
| 2,199,377 A * | 4/1940 | Tangerman .............. 72/333 |
| 2,301,636 A | 11/1942 | Nicol |
| 2,671,491 A | 3/1954 | Biordi et al. |
| 2,775,284 A | 12/1956 | Hermann |
| 2,853,330 A | 9/1958 | Harry |
| 2,988,033 A | 6/1961 | Gapp |
| 3,053,733 A | 10/1962 | Hermann |
| 3,110,371 A | 11/1963 | De Ridder |
| 3,209,432 A | 10/1965 | Cape |
| 3,253,375 A | 5/1966 | Takehara |
| 3,310,925 A | 3/1967 | Le Brun |

(Continued)

FOREIGN PATENT DOCUMENTS

DE 459 074 C 4/1928

(Continued)

OTHER PUBLICATIONS

International Search Report and Written Opinion dated Feb. 26, 2008.

*Primary Examiner*—Glenn Dayoan
*Assistant Examiner*—Gregory Blankenship
(74) *Attorney, Agent, or Firm*—Flynn, Thiel, Boutell & Tanis, P.C.

(57) ABSTRACT

A roll-formed one-piece vehicle bed member has a plurality of ribs and valleys extending longitudinally along the bed member in sidewardly adjacent, parallel relation. The bed member terminates at front and rear edges wherein preferably along the rear edge of the bed member, rib channels are formed centrally along the end portion of each rib for direct contacting engagement with a rear sill to provide an improved connection therebetween.

6 Claims, 16 Drawing Sheets

U.S. PATENT DOCUMENTS

| | | | | |
|---|---|---|---|---|
| 3,481,643 | A | 12/1969 | Campbell | |
| 3,838,590 | A | 10/1974 | Van Dijk | |
| 4,014,148 | A | 3/1977 | Harter | |
| 4,109,503 | A * | 8/1978 | Francon et al. | 72/352 |
| 4,188,058 | A | 2/1980 | Resa et al. | |
| 4,215,898 | A | 8/1980 | Ulics | |
| 4,354,708 | A | 10/1982 | Koto | |
| 4,631,891 | A | 12/1986 | Donavich | |
| 4,750,776 | A | 6/1988 | Barben | |
| 4,914,886 | A | 4/1990 | Eriksson et al. | |
| 5,137,322 | A | 8/1992 | Muirhead | |
| 5,188,418 | A | 2/1993 | Walworth, Jr. et al. | |
| 5,231,862 | A | 8/1993 | Ashley | |
| 5,544,932 | A | 8/1996 | Walworth, Jr. et al. | |
| 5,575,525 | A * | 11/1996 | Walworth et al. | 296/184.1 |
| 5,730,486 | A | 3/1998 | Jurica | |
| 5,755,481 | A | 5/1998 | Emery | |
| 5,938,272 | A * | 8/1999 | Jurica et al. | 296/184.1 |
| 6,128,815 | A | 10/2000 | Jurica et al. | |
| 6,170,905 | B1 * | 1/2001 | Jurica | 296/184.1 |
| 6,286,352 | B1 | 9/2001 | Hackstock | |
| 6,347,454 | B1 * | 2/2002 | Jurica et al. | 29/897.2 |
| 6,799,792 | B2 * | 10/2004 | Jurica et al. | 296/184.1 |
| 7,430,806 | B2 * | 10/2008 | McNulty et al. | 29/897.2 |
| 2003/0047964 | A1 * | 3/2003 | Jurica et al. | 296/183 |

FOREIGN PATENT DOCUMENTS

| | | |
|---|---|---|
| DE | 30 12 567 A1 | 10/1981 |
| EP | 0 072 739 A1 | 2/1983 |
| FR | 1 329 659 | 5/1963 |
| FR | 1 432 250 | 2/1966 |
| GB | 1 036 474 | 7/1966 |
| JP | 57-130726 | 8/1982 |
| WO | WO 93/19972 | 10/1993 |

* cited by examiner

VEHICLE BED EDGE CONSTRUCTION AND MANUFACTURING PROCESS THEREFOR

CROSS REFERENCE TO RELATED APPLICATION

This application claims the benefit of U.S. Provisional Application Ser. No. 60/876,686, filed Dec. 22, 2006, which is incorporated herein by reference in its entirety.

FIELD OF THE INVENTION

This invention relates to the construction of a vehicle bed, such as a pickup truck bed, and more particularly relates to an improved construction for a one-piece ribbed floor pan or bed member which is particularly suited for a vehicle bed used in heavy duty applications, and the invention further relates to an improved manufacturing process for such a bed construction.

BACKGROUND OF THE INVENTION

To improve upon the construction of truck bed members which are formed using a conventional stamping process, the assignee of this application developed the improved truck bed structures and forming methods disclosed in U.S. Pat. Nos. 5,188,418, 5,544,932, 5,575,525, 5,730,486, 5,938,272, 6,128,815, 6,170,905, 6,286,352, 6,347,454 B1, 6,799,792 B2 and all of which are assigned to Pullman Industries, Inc., and are herein incorporated by reference.

In the aforesaid patents, and the exemplary bed assembly illustrated in FIG. 1, there is disclosed a main floor pan or bed member 11 which was developed principally for a conventional duty pick-up truck so that the bed member 11 is disposed between the side walls 12 of the truck and extends rearwardly from the front wall 13 so as to terminate at the rear sill 14. The bed member has the rear edge thereof secured, typically by welding, to the rear sill 14, and the bed member is typically supported on and fixedly secured to additional cross sills which are spaced longitudinally along the bed, such as the intermediate cross sills 15 and the front sill 16. The bed member 11 is roll formed from a continuous sheet of thin steel so as to have alternating ribs 18 and valleys 19 of channel-like cross-section disposed sidewardly thereacross with such ribs and valleys extending longitudinally along the roll formed sheet. The roll formed sheet is then cut to length to define the bed member.

In the illustrated bed member 11, the bed member 11 has the front and rear edges thereof having a corrugated configuration defined by the alternating ribs and valleys. In a preferred variation of this bed construction, the rear sill 14 is provided with protruding projections 17 on the top wall thereof, which projections interfit within the channels of the bed member 11 at the rear edge thereof to provide for a strong structural assembly while also closing off the rear ends of the ribs.

The arrangement described above and as briefly illustrated in FIG. 1 has proven to provide a highly desirable bed assembly for many applications. However, the projections 17 are conventionally stamped, which may be difficult to accomplish for heavy-duty applications using high-strength steel.

In a continuing effort to provide for and accommodate other demands associated with the use of pickup-type vehicles, the assignee hereof has also developed a modified end construction for the bed member 11 which, as illustrated by FIGS. 2-5, results in the ends of the ribs 18 being flattened downwardly through a tapered or downwardly sloped rib section so as to merge with the bottom of the bed member, namely the walls which define the bottoms of the valleys, so as to effect closure of the ends of the ribs and at the same time result in the edge of the bed member being generally flat.

As disclosed in U.S. Pat. No. 6,347,454 B1 which is incorporated herein by reference, the construction illustrated by FIGS. 2-5 results in a modified edge construction for the roll-formed bed member 11 so as to permit the edge portion of the bed to be supported on a conventional cross sill 21 (which can be either a rear sill or a front sill) without the necessity of providing the top wall of the sill with upward projections for nesting within the channels of the ribs, although provision of such projections on the cross sill is still a preferred alternative. In this edge construction, the bed member 11 is provided with a flat and substantially planar flange 22 extending transversely across the bed member, which flange terminates at a free edge 23 of the bed member. The flange 22 is defined by deforming and hence flattening rear portions of the channel-like ribs 18 over a selected longitudinal length which projects forwardly from the free edge 23.

The bed member 11 of FIGS. 2-4 in addition has the ribs 18 thereof, just forwardly of the flange 22, downwardly deformed to define tapered rib portions 18A which extend longitudinally of the bed member over a small longitudinal distance, and define a transitional zone between the rear flange 22 and the longitudinally-extending full-height rib 18. The tapered rib portions 18A each have a top wall 25A which at one end is continuous with and joins to the top wall 25 of the full-height rib 18, with the top wall 25A then angling or sloping downwardly as it projects longitudinally until intersecting the plane of the bed member base walls 26 (the latter defining the bottom of the valleys 19), which intersection substantially defines the transition between the tapered rib portions 18A and the rear flange 22. The tapered rib portions 18A thus effectively define a slope or ramp which projects upwardly from the elevation of the base walls 26 or flange 22 to the elevation of the rib top walls 25, with the ramp projecting in a longitudinal direction which, when the tapered rib portion is at the rear edge of the bed member, slopes upwardly in the forward direction of the bed member to thus eliminate or minimize any abrupt or sharp corners at the rear edge of the bed member.

The tapered rib portions 18A are shaped by physically deforming a selected length of the full-height ribs 18 downwardly into the tapered or sloped configuration, which forming typically is carried out in a shaping press following the roll forming of the bed member. The deforming (i.e. compressing) of the ribs 18 into the tapered configuration results in at least partial collapsing of the side walls 27 of the ribs, and the tapered rib portion 18A is preferably formed so that the top wall 25A thereof extends at a slope or angle relative to the horizontal of at least about 30°, and more preferably in the neighborhood of about 40° to about 45°, in an effort to minimize the amount of material which is being physically displaced during the compression of the ribs into the tapered shape.

During the deforming of the end portions of the ribs 18 so as to form the tapered rib portions 18A, the end portions of the ribs 18 which extend between the tapered portions 18A and the rear edge 23 are also substantially simultaneously flattened during the same deforming or pressing operation so that the rib portions which extend throughout the longitudinal length of the flange 22 are effectively flattened so as to be substantially coplanar with the base walls 26 and thereby result in the substantially flat and planar edge flange 22.

With the arrangement as illustrated by FIG. 2, the flange 22 can be positioned so as to lie flatly on an upper surface of the cross sill so as to permit closure and fixed securement therewith.

Alternatively, the flattened rear flange, designated 22A in FIG. 5, can be bent downwardly in the vicinity adjacent or slightly rearwardly from the intersection point with the tapered rib-portions 18A, which flange 22A can be disposed so as to project downwardly directly adjacent and hence overlap a side surface of the supporting cross sill 21, such as the rear surface when the cross sill 21 constitutes the rear sill of the vehicle bed construction. In this arrangement the flange 22A can be fixedly secured to the cross sill, such as by welding.

While the rib end constructions illustrated by FIGS. 2-5 may be desirable for some use situations, nevertheless these rib end constructions created by reforming a roll-formed bed member result in undesired wrinkling of the material during the deforming or flattening operation. In order to deform the full-height rib into either the tapered rib portion and/or the flat rear flange, it is necessary to cause the excess material which exists due to the presence of the side walls 27 to be redistributed so as to merge into the material associated with the adjacent top or bottom walls 25 and 26. Because of this excess material, stamping of the rear ends of the ribs is normally unable to effectively redistribute this excess material, and hence the tapered rib portions 18A particularly in the vicinity of the sides thereof, and particularly the flat rear flange 22 in the vicinity where the side walls 27 previously existed, often exhibit significant wrinkling due to the excess material so that the resulting wall structure not only loses its desired uniformity of thickness but also results in undesired surface characteristics which may be considered unacceptable, particularly when painting or the like.

Accordingly, in a continuing effort to improve the construction of bed members formed initially by roll forming, and which are then subjected to further forming such as pressing so as to define tapered end configurations similar to those depicted by FIGS. 2-5, another improved tapered rib end configuration and forming process has been developed which permits end portions of the roll-formed ribs to be subsequently deformed, as by stamping, and which construction and process eliminates or at least greatly minimizes undesired wrinkling by permitting more effective redistribution of excess material during the deforming operation, and which in addition provides the resulting tapered rib portion with increased strength and rigidity. This further construction is disclosed in U.S. Pat. No. 6,799,792 B2 and further illustrated in FIGS. 6-10 hereof.

Referring to FIG. 6, there is illustrated a portion of a vehicle bed member 11 which is of an integral one-piece construction formed by longitudinally roll forming a thin metal sheet such that the sheet initially has downwardly-opening channel-like ribs 18 extending longitudinally in sidewardly spaced but parallel relationship, with these ribs being sidewardly spaced by intermediate valleys 19. The ribs 18 are provided with a flat flange 31 along at least one transverse end edge thereof, which flange joins to the ribs 18, with the latter having tapered rib end portions 32 associated therewith similar to the arrangements of FIGS. 2-5 except that the tapered rib portions 32 and the flange 31 are both shaped so as to compensate for the excess material which exists during flattening of the ends 35 of the ribs 18 to thus eliminate or at least greatly minimize the presence of wrinkles either in the tapered rib end portion 32 or in the end flange 31.

The top wall of the tapered rib portion 32 is offset downwardly relative to the top and side edges thereof so as to define a shallow downwardly-offset recess 33, and the flange 31 where it merges with the tapered rib portion is, over a selected longitudinal extent of the flange 31, offset upwardly so as to define a recess 34. These recesses 33 and 34 are substantially simultaneously formed during flattening or deforming of the rib end portion, which flattening basically involves that portion of the rib which extends to the free end of the bed member, substantially as diagrammatically depicted by dotted lines 35 in FIG. 7.

With respect to the construction of the tapered rib portion 32, this portion longitudinally merges with the top wall 25 of the rib 18 such that, during the deforming of the rib end portion 35, the top wall 25 at its juncture to the tapered rib portion 32 is bent downwardly through a substantially reverse bend, i.e., a shallow S-curve bend 36, for merger with a generally flat but downwardly sloped end wall 37 of the tapered rib portion 32. This substantially flat end wall 37 extends transversely (i.e., sidewardly) between raised edge portions 38 which slope downwardly from their juncture with the top rib wall 25 in parallel relation to the top sloped wall 37. The edge portions 38 extend generally along the side walls 27 of the rib for merger with the flat and planar flange 31 at a location spaced longitudinally from the free edge 39 of the flange. The edge portions 38 effectively protrude upwardly above the tapered end wall 37 so as to define the downward offset recess 33 therebetween. The projections 38 are of a generally upwardly rounded arcuate shape so as to provide a continuous merger between the end wall 37 and the rib side walls 27. Due to the provision of the recess 33 and the downward offset of the tapered end wall 37 created thereby, this results in the formation of the arcuate projections 38 which have a generally downwardly-opening channel or U-shaped configuration so that these projections hence require additional material to form, and thus compensate for the excess material created during the deformation process.

During the forming of the tapered rib portion 32 as discussed above, the deformation of the rib end portion 35 also results in simultaneous formation of the flat edge flange 31, and the latter is also additionally and substantially simultaneously deformed so as to create therein the recess 34 which in effect results in formation of a raised wall or platform 41 which joins to the lower edge of the tapered top wall 37 and which projects longitudinally outwardly of the flange 31 so as to terminate at a rear edge 42 which is still spaced longitudinally from the free edge 39. This platform 41 as illustrated preferably has a width which approximately corresponds to the spacing between the raised side protrusions 38 adjacent the lower ends thereof where these protrusions merge into the flange 31. The raised wall or platform 41 is preferably generally flat or planar, and is generally parallel with but raised upwardly from the flange 31, with the side edges 43 of the platform 41 generally being disposed so as to merge in with the lower side edges of the tapered top wall 37.

The creation of the platform 41 accordingly results in the formation of the edge walls 42 and 43 which extend generally vertically and join the raised platform 41 to the flange 31, whereby these edge walls 42 and 43 hence require additional material to permit formation thereof. These walls 42, 43 are thus formed using much of the excess material which is created during flattening of the rib end portion 35.

Despite these improvements as described above, it is an object of the invention to provide a further improved vehicle bed member, preferably formed substantially through roll-forming which is usable with conventional duty vehicles and is particularly suitable for heavy-duty applications using high-strength steel. The invention therefor relates to an improved bed assembly having a panel-like bed member which preferably is roll-formed so as to have the aforementioned ribs and valleys formed therein. The invention relates to this bed member which is further improved so as to cooperate with a high-strength rear sill member in a manner which has an increased structural rigidity and strength and greater weld capability for welding the bed member to a sill and preferably at least to the rear sill.

In this bed member, the bed member is initially roll-formed so as to be formed with longitudinally extending channel-like ribs and sidewardly spaced but parallel valleys. Along the rear edge of the bed member, the bed member is subsequently shaped after roll-forming so as to form an elongate channel extending centrally along the middle of each rib between opposite rib walls, which channel has a bottom channel wall that extends in the bottom plane of the bed member for direct facing, contacting engagement with an upper surface of the rear sill to not only provide additional support to the rear edge of the bed member, but also define a weld location located within the width of the rib. As described in further detail herein, this improved bed member with end channels being formed centrally within each rib results in an improved, high-strength connection between the rear sill and an increased contact area and quantity of weld areas to generate a stronger connection that accommodates increased bed loads.

With the improved bed member of this invention, the one-piece roll-formed bed member can be formed generally to occupy only the center portion of the truck bed, namely that portion which extends between the wheel wells of the vehicle, or in the alternative the one-piece bed member may be formed so as to define the entire truck bed width by having the wheel wells cut therefrom. Both of these variations are disclosed in the assignee's earlier patents, identified above, and are encompassed within the present invention. Further, while the rib construction of this invention is particularly desirable for use at the rear edge of the bed member for cooperation with the rear sill of the vehicle, it will be appreciated that the improved rib construction of this invention is equally applicable for use at the front end of the bed member, either by itself or in conjunction with use of the same or a similar rib construction at the rear end of the bed member.

With the improved interconnection between the bed and sill, higher strength steel and higher-load capacity sills may be used since roll-forming is the primary process used to form the sill and bed member and is better able to accommodate the high-strength steel.

Other objects and purposes of the invention, and variations thereof, will be apparent upon reading the following specification and inspecting the accompanying drawings.

Figure 1:
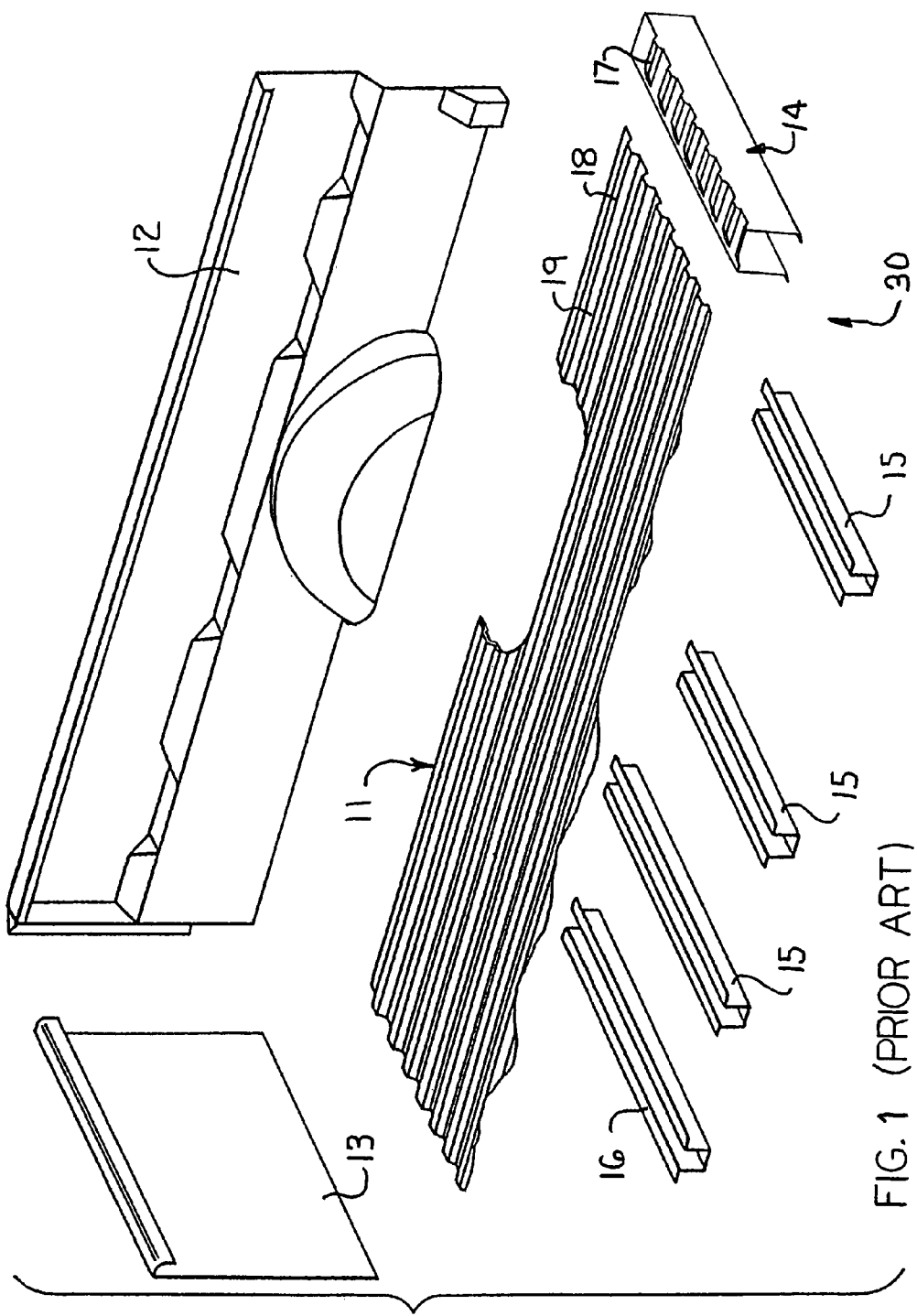
FIG. 1 is an exploded perspective view illustrating the basic components which cooperate with the pan or bed member of a truck according to the prior art.
Figure 2:
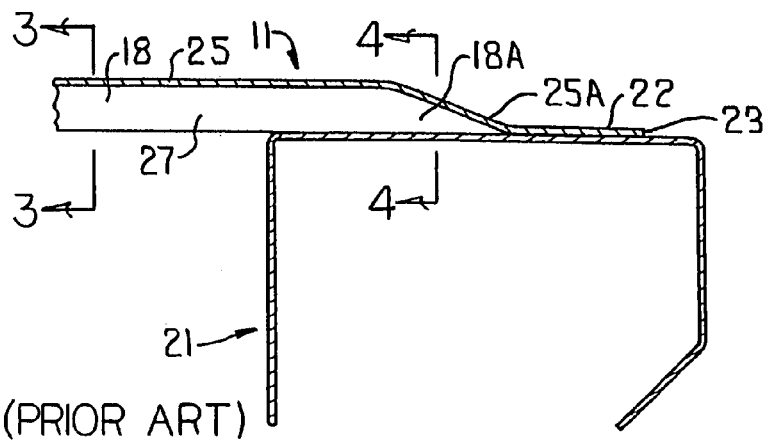
FIG. 2 is an enlarged fragmentary cross-sectional view illustrating a modified end construction of a roll-formed bed member and its connection to a cross sill according to a prior development of the assignee hereof.
Figure 3:
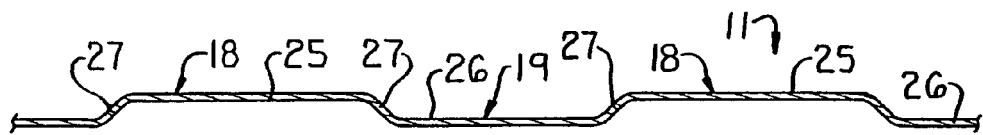
FIG. 3 is a fragmentary cross-sectional view taken generally along line 3-3 in FIG. 2 and showing the cross-section of the roll-formed bed member.
Figure 4:
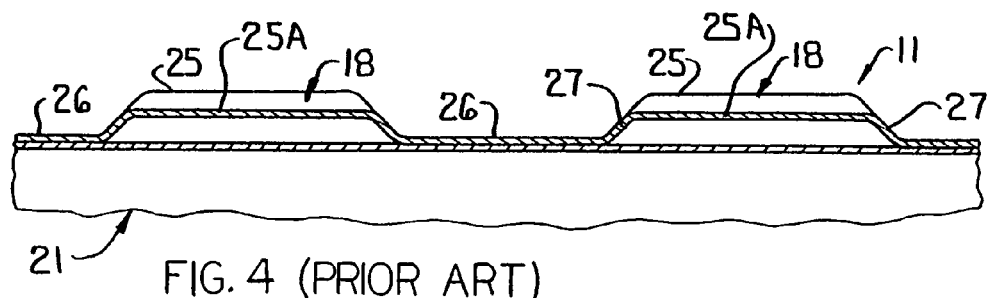
FIG. 4 is a fragmentary cross-sectional view taken generally along line 4-4 in FIG. 2 and showing the cross-section through the tapered rib portions of the bed member.
Figure 5:
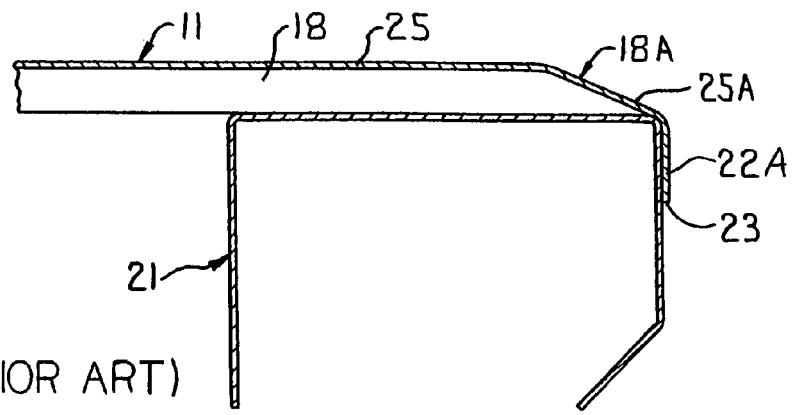
FIG. 5 is a view similar to FIG. 2 but illustrating a variation thereof.
Figure 6:
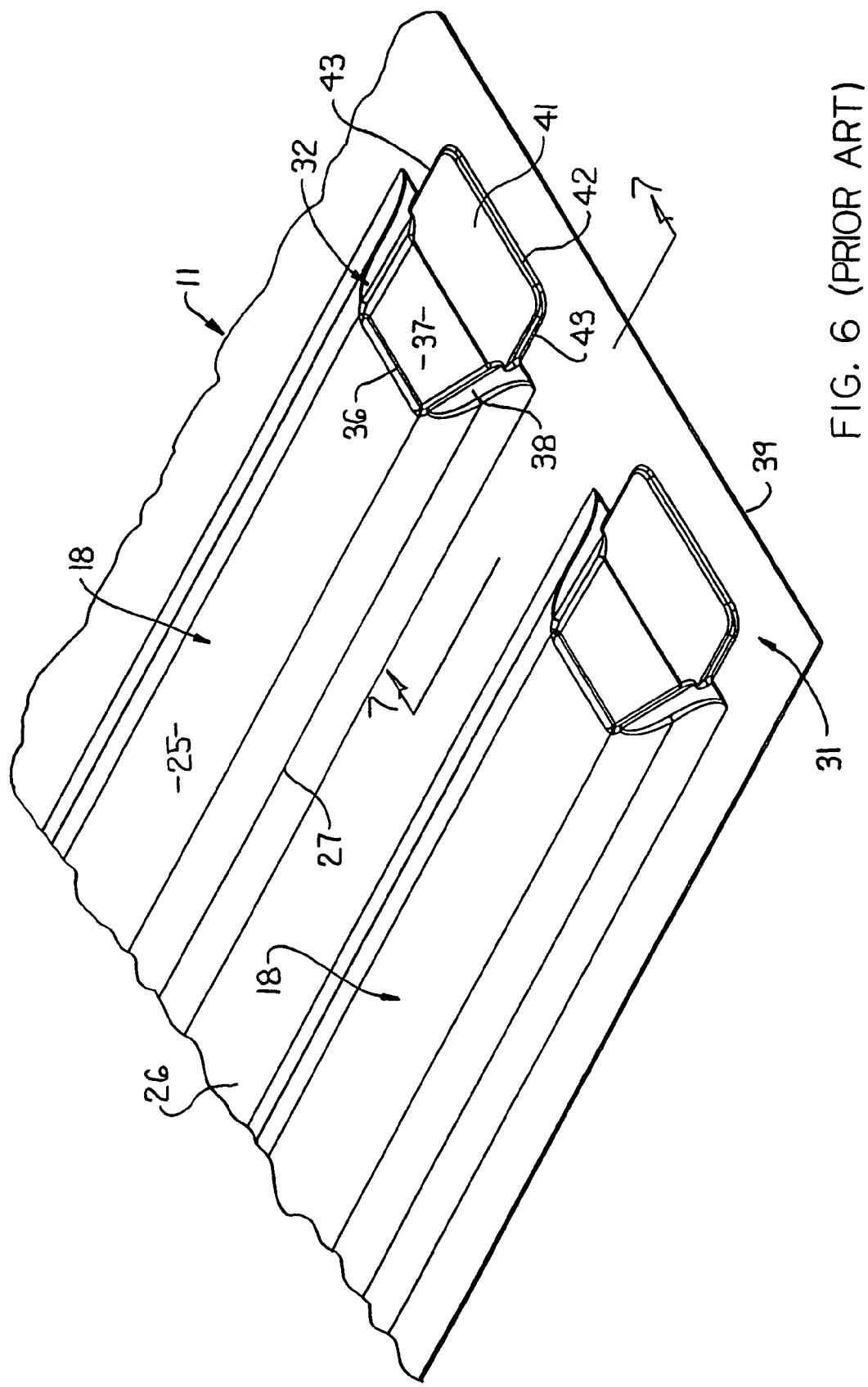
FIG. 6 is a fragmentary perspective view which illustrates a further tapered end construction associated with channels of a roll-formed bed member.
Figure 7:
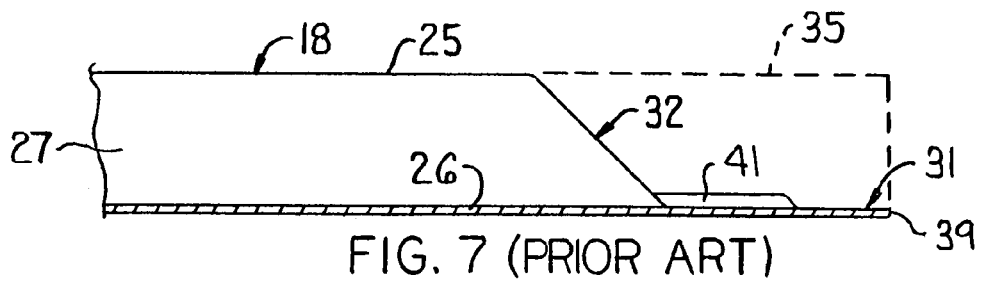
FIG. 7 is a fragmentary side view of the tapered end portion of the rib as taken generally along line 7-7 of FIG. 6.
Figure 8:
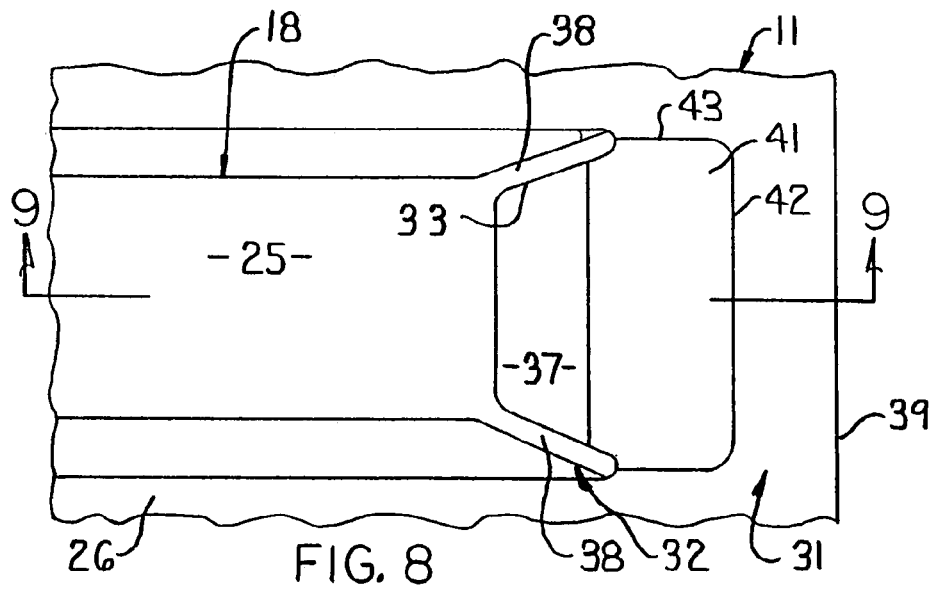
FIG. 8 is a top view of the rib end portion illustrated in FIG. 7.
Figure 9:
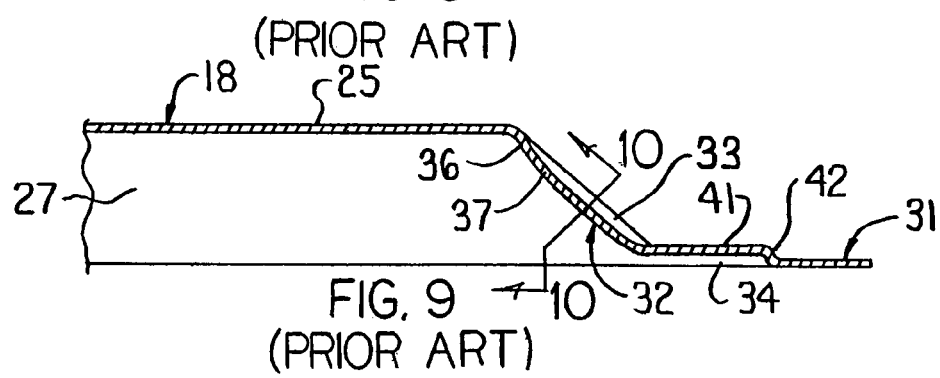
FIG. 9 is a fragmentary sectional view taken generally along line 9-9 of FIG. 8.
Figure 10:
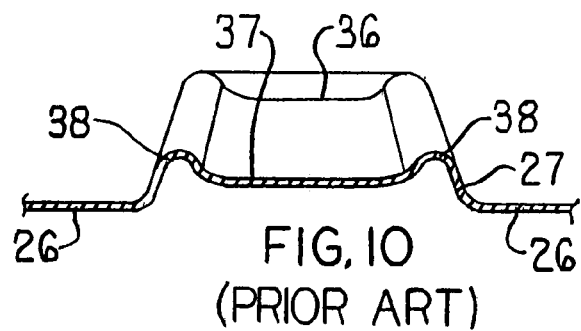
FIG. 10 is a fragmentary sectional view taken along line 10-10 in FIG. 9.

Certain terminology will be used in the following descriptions for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the bed member and designated parts thereof. Said terminology will include the words specifically mentioned, derivatives thereof, and words of similar import.

DETAILED DESCRIPTION

Figure 11:
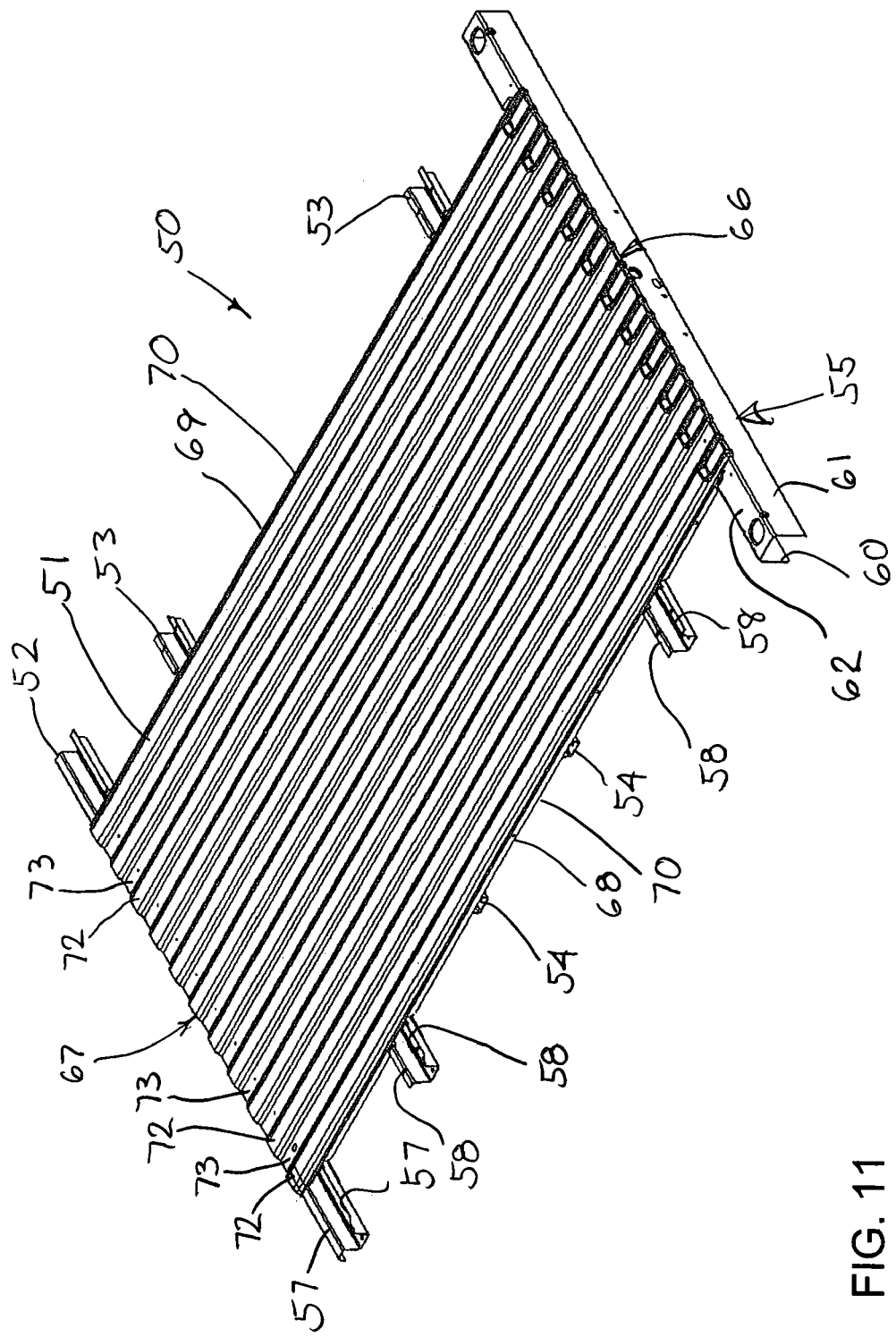
FIG. 11 is a perspective view of the improved bed assembly of the invention including a bed member and the front sill, intermediate cross sills and rear sill thereof.

Referring to FIG. 11, a high-strength vehicle bed assembly 50 of the invention is illustrated, which assembly 50 comprises a main floor pan or bed member 51 which is illustrated as being mounted on a plurality of cross sills comprising a front sill 52, first intermediate cross sills 53, second intermediate cross sills 54 shorter than the first sills 53, and a rear sill 55. Generally, the sills 52-55 are structurally and functionally similar to the above-described sills 14-16 of FIG. 1 with the front and rear sills 52 and 55 corresponding to the front and rear sills 16 and 14 while the intermediate sills 53 and 54 correspond to those intermediate sills 15 described above. It is understood that the bed assembly 50 is readily usable in conjunction with the bed side walls 12 and front wall 13 of FIG. 1 or other similar known constructions such that it is unnecessary to further describe such components hereinafter.

Further, it is noted that the bed member 51 has a roll-formed rectangular shape which is sized to fit between the wheelwell housings formed, for example, in the side walls 13. In such a construction, additional secondary bed members would be provided to fill in the spaces located forwardly and rearwardly of such wheelwell housings in a conventional manner and as disclosed in greater detail in U.S. Pat. No. 6,347,454 B1. As also disclosed in this patent, it will be understood that the bed member 51 may also have a greater dimension in the lateral direction between the truck bed side walls so that such secondary bed members would not be formed separate but instead would define integral sideward extensions of the bed member 51. For the present invention, the inventive bed member 51 may take a variety of forms so as to be adapted to and incorporated into known vehicle truck bed constructions.

More particularly, it will be readily understood by the skilled artisan that the cross sills 52-55 would be mounted to the vehicle frame for supporting the bed member 51 with the vehicle further including the additional bed components including side walls, front wall and rear tailgate.

As to the front sill 52 and intermediate cross sills 53 and 54, such components generally have an upward-opening U-shaped profile as viewed from the side, which profile defines respective outwardly projecting side flanges 57, 58 and 59 that are oriented in an upward-facing orientation for vertically supporting the bottom surface of the bed member 51 thereon.

Figure 12:
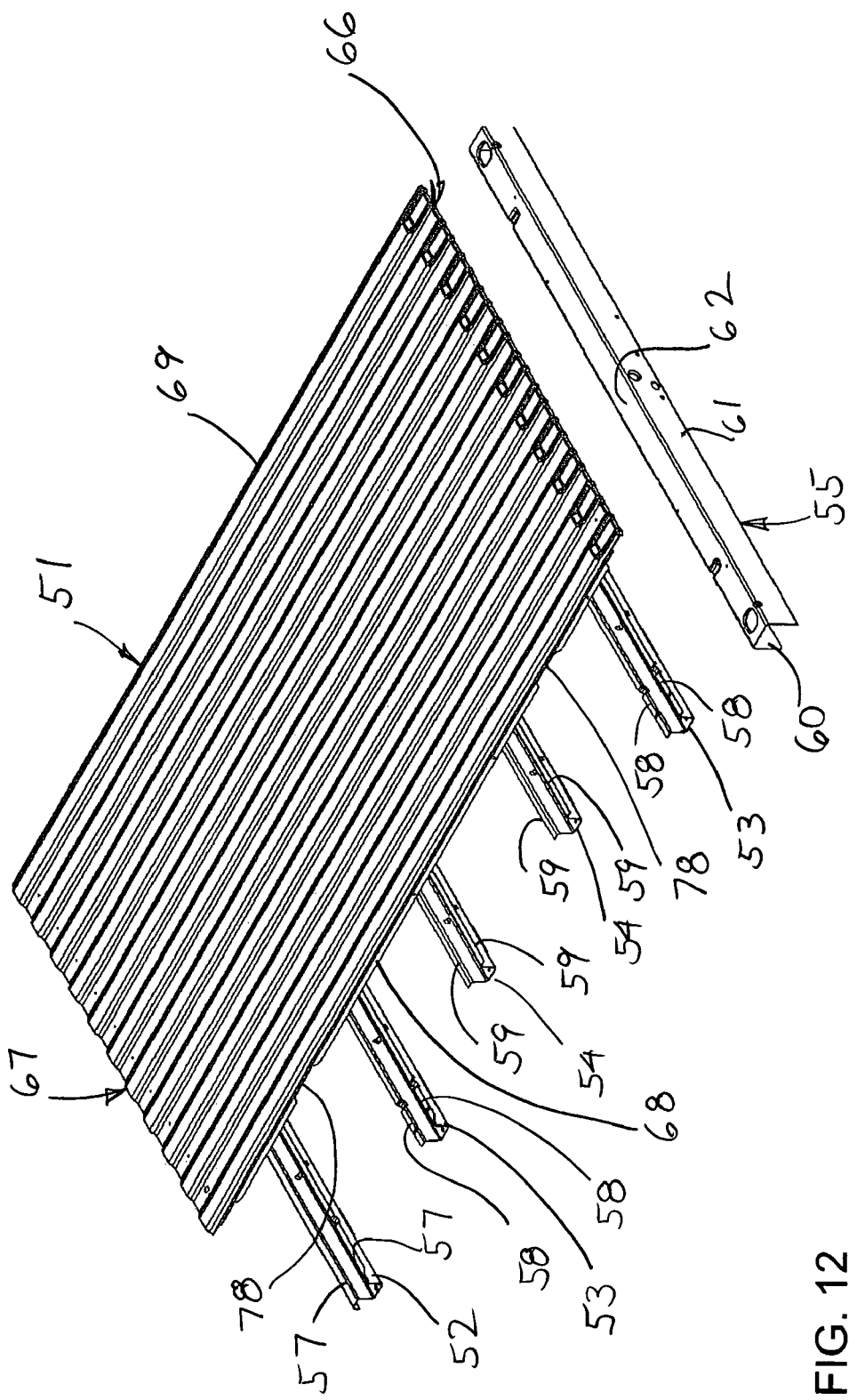
FIG. 12 is an exploded perspective view of the components of FIG. 11.
Figure 13:
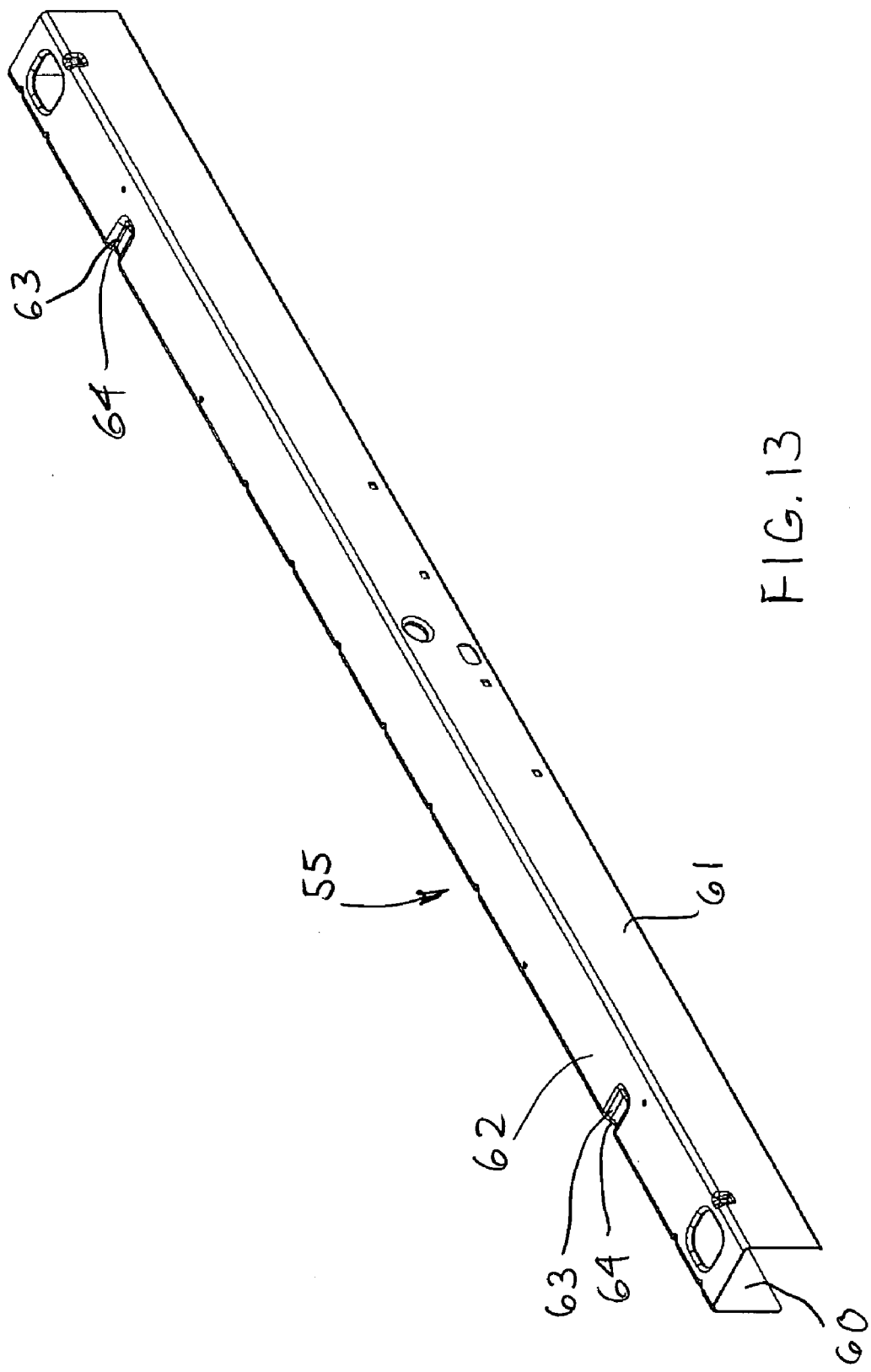
FIG. 13 is a perspective view of the rear sill.

As to the rear sill 55 as seen in FIGS. 12 and 13, such sill 55 has a downward opening, U-shaped cross-sectional profile as viewed from the side which is defined by sill side walls 60 and 61 that are joined integrally together along their top edges by a top sill wall 62. At least this rear sill 55 is formed of a high strength steel such that the rear sill 55 has a 40 ksi capacity, and potentially higher where suitable to increase the load capacity of a pickup. While some bed constructions have incorporated protruding projections such as projections 17 of FIG. 1, such rear sills are more complicated to produce particularly with high-strength steel. The rear sill 55 has a greatly simplified profile which facilitates formation of the rear sill 55 by roll-forming of the high-strength steel. In particular, the top sill wall 62 for the most part is flat along its entire longitudinal length and thus, does not include complex formations which would otherwise complicate the manufacturing process. It is noted that the top sill wall 62 does include a pair of longitudinally spaced apart locator recesses 63 which open upwardly and generally forwardly for cooperation with the bed member 51 as will be described in further detail hereinafter. Preferably, the locator recesses 63 are formed by a subsequent re-forming process, such as by a stamping operation. While this step is performed as an additional step after roll-forming of the basic U-shaped profile of the rear sill 55, such stamping is also greatly simplified by the simple construction and profile of the recesses 63.

Turning again to FIGS. 11 and 12, the bed member 51 is constructed with an improved configuration so as to provide a stronger interconnection between the bed member 51 and at least the rear sill 55. While the following discussion focuses upon the formation of the bed member 51 in its cooperation and fastening to the rear sill 55, it will be understood that the configuration and construction of the bed member 51 may also be modified so as to include the same formations found on the rear bed edge 66 also at the front bed edge 67. Such modification may also require modification of the front sill 52, but it will be understood that such a modification is readily within the scope of this invention and does not require a greater discussion thereof.

Figure 19:
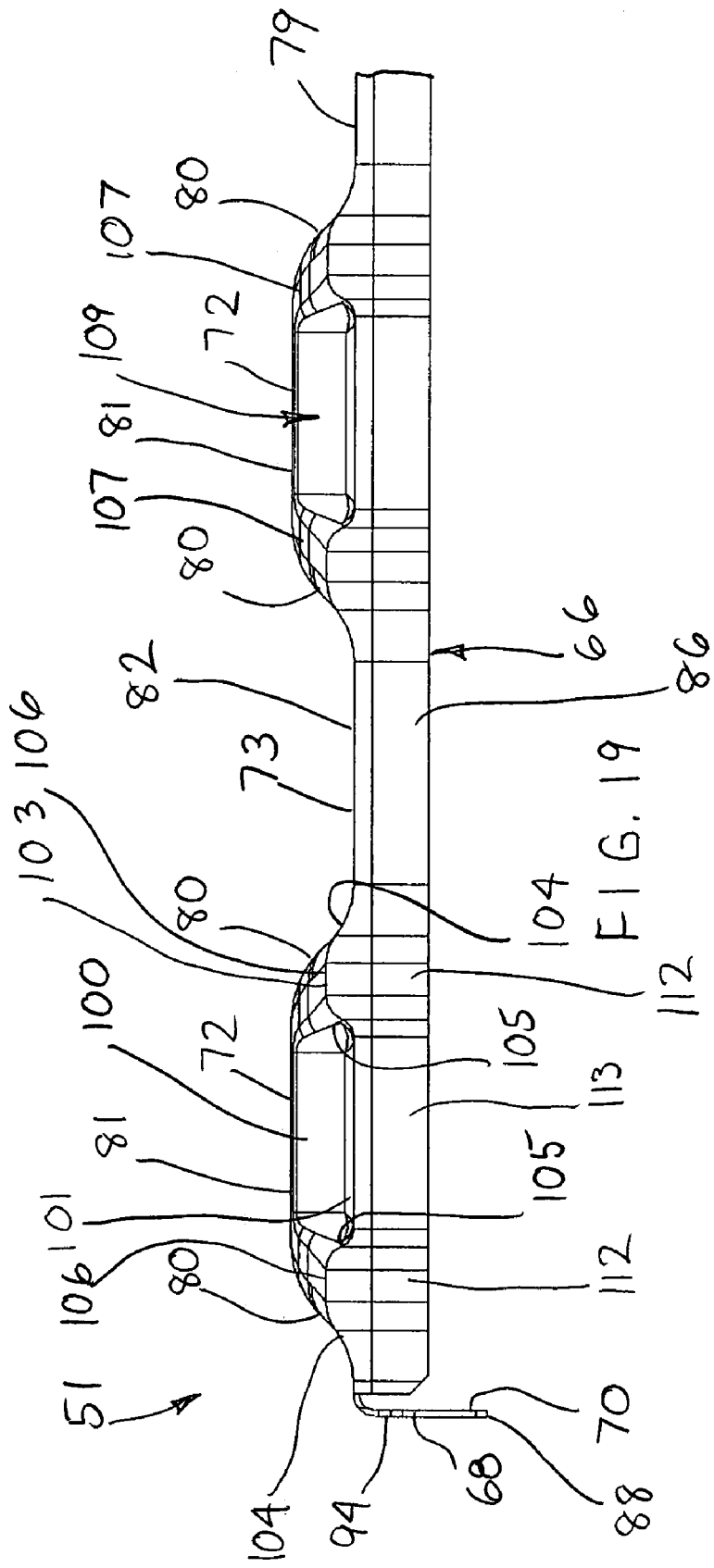
FIG. 19 is a fragmentary end view of the bed member.

More particularly as to the bed member 51, such bed member 51 has opposite side edges 68 and 69 which extend longitudinally in the front-to-back direction between the rear and front bed edges 66 and 67. As seen in FIGS. 11, 12 and 19, each side edge 68 or 69 is formed with a downwardly depending side flange 70.

Inwardly thereof, the bed member 51 is preferably formed by roll-forming in accord with the above-described discussion so as to include alternating ribs 72 and valleys 73 which are structurally and functionally similar to the above-described ribs and valleys of the aforementioned bed members such as the ribs 18 and valleys 19 of the bed member 11. These ribs and valleys 72 and 73 are disposed in longitudinally adjacent, alternating relation and extend along the entire longitudinal length of the bed member 51. The bed member 51 preferably is formed from a continuous sheet of thin steel by roll-forming such stock material to thereby form the alternating ribs and valleys 72 and 73. Thereafter, the continuous roll-formed sheet is then cut to length to define the bed member in accord with the above discussion. It will be understood that it is possible to also form the bed member 51 by stamping a rectangular sheet of stock material, although the preferred manufacturing method includes a roll-forming station to continuously shape the continuous sheet and a cutting station to thereby sever individual bed members from the material exiting the roll-forming station.

When such stock material for the bed member 51 is severed, the opposite ends of such ribs 72 and valleys 73 are open longitudinally as can generally be seen in FIG. 11 along the front bed edge 67 which in the illustrated embodiment maintains the initial profile defined by the roll-forming station. As will be described in further detail herein, a further reshaping operation, and preferably a stamping operation, is performed upon the stock bed member 51 to shape the rear bed edge 66 to include the channeled edge formations generally seen in FIG. 11 and discussed in greater detail hereinafter.

Generally during this reshaping operation, the opposite bed side edges 68 and 69 and the bottom surfaces of the valleys 73 are each configured to downwardly abut against and be directly supported by the opposing upward facing side flanges 58 or 59 of the intermediate sills 53 or 54. This provides direct support to the bed member 51 along the longitudinal length thereof. The side flanges 68 and 69 each include a notch 78 (FIG. 12) to allow for the passage of the longer intermediate cross sills 53 which extend beyond the sideward extent of the bed member 51 forwardly and rearwardly of the wheelwell housings.

Figure 14:
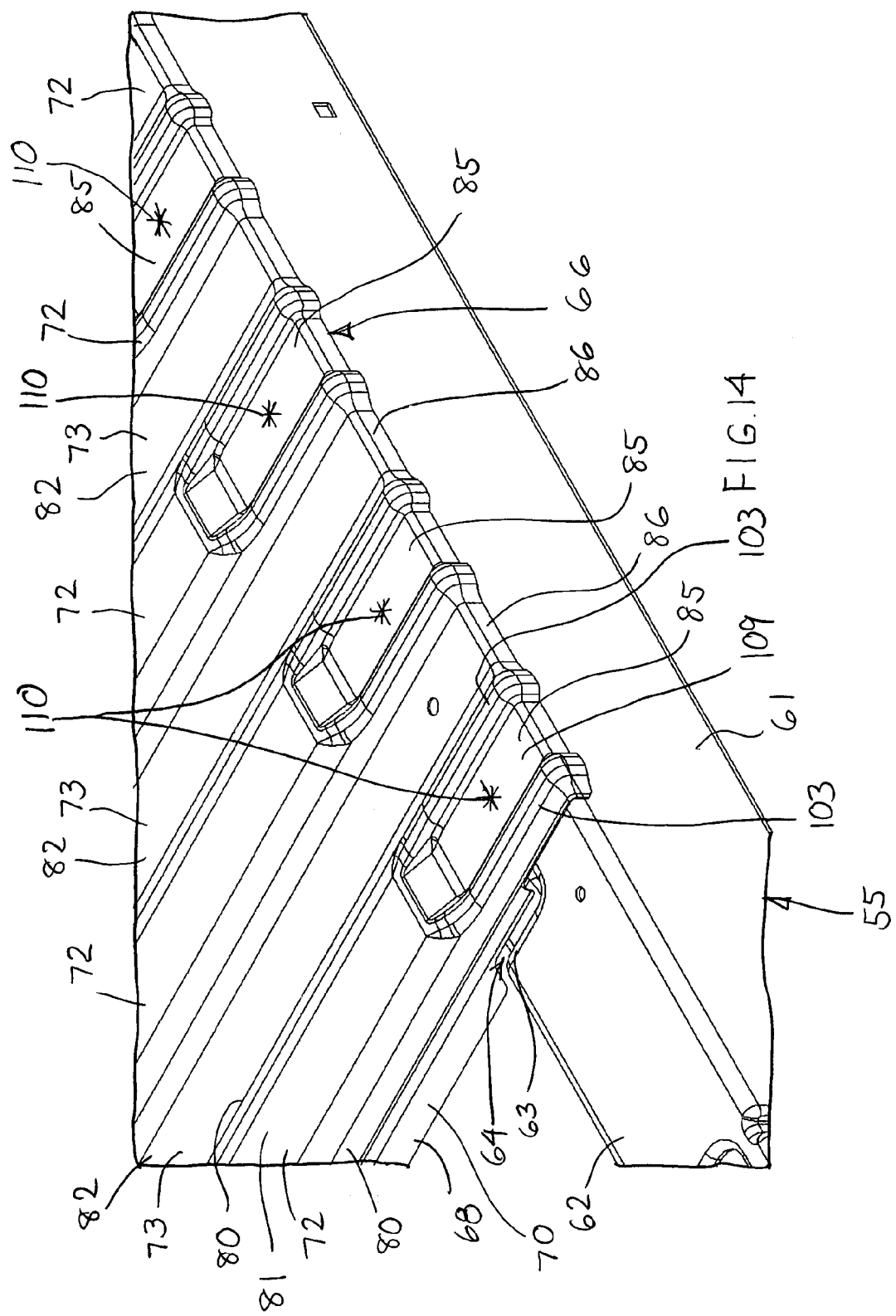
FIG. 14 is a fragmentary perspective view of the interconnection between the bed member and rear sill.

As best seen in FIGS. 14 and 19, the ribs 72 are defined by upwardly inclined side rib walls 80 which converge toward each other and turn into a top rib wall 81 that is generally flat and extends horizontally between the opposite pair of rib walls 80 that define a single rib 72.

Between each sidewardly spaced, parallel pair of ribs 81, a valley 73 is defined between the side rib walls 80, which valley 73 preferably is defined by a bottom valley wall 82 that extends sidewardly between the spaced pair of rib side walls 80 of two adjacent ribs 81. The bottom valley walls 82 are formed coplanar with each other across the width of the bed member 51 so as to lie flat against the supporting cross sills 52, 53 and 54. It is noted that these bottom valley walls 82 furthermore are disposed coplanar with the bottom pocket walls 76 described above which also lie in the same bottom plane of the bed member 51. These alternating ribs 72 and valleys 73 have a similar cross-sectional profile when viewed from the end of the bed member 51 which is similar to those profiles described above wherein the ribs 81 protrude upwardly and define a downward-opening channel while the intermediate valleys 73 define respective upward-opening channels.

The bed member 51 is further improved along the rear bed edge 66 in that this bed edge 66 is reshaped along the lateral width thereof so as to further strengthen this edge region and provide improved high-strength structural cooperation and interconnection of the bed member 51 with the rear sill 55. Generally, the rear bed edge 66 is reshaped, preferably by stamping, so that the end portions of the ribs 72 are provided with central channels 85 that extend rearwardly and overlie the top sill wall 62 for direct connecting engagement and fastening therewith. The individual channels 85 extend rearwardly and then the bed member 51 turns downwardly to define a rear edge flange 86 along the lateral width thereof which extends downwardly a short distance and abuts against and overlies the upper edge portion of the side will walls 61 as seen in FIG. 14.

More particularly as to the formation of the rear bed edge 66 and its cooperation with the rear sill 55, the bed member 51 generally is shaped to closely cooperate with the sill member 55 and also locates same sidewardly along the lateral width thereof. Referring first to FIGS. 15-18, the bed side flanges 68 and 69 each generally has a constant vertical dimension along most of the longitudinal length of the bed member 11 except for the portion thereof disposed proximate the rear bed edge 66. Since the side flanges 68 and 69 are formed identical, the following discussion focuses on flange 68 but is equally applicable to flange 69.

Figure 21:
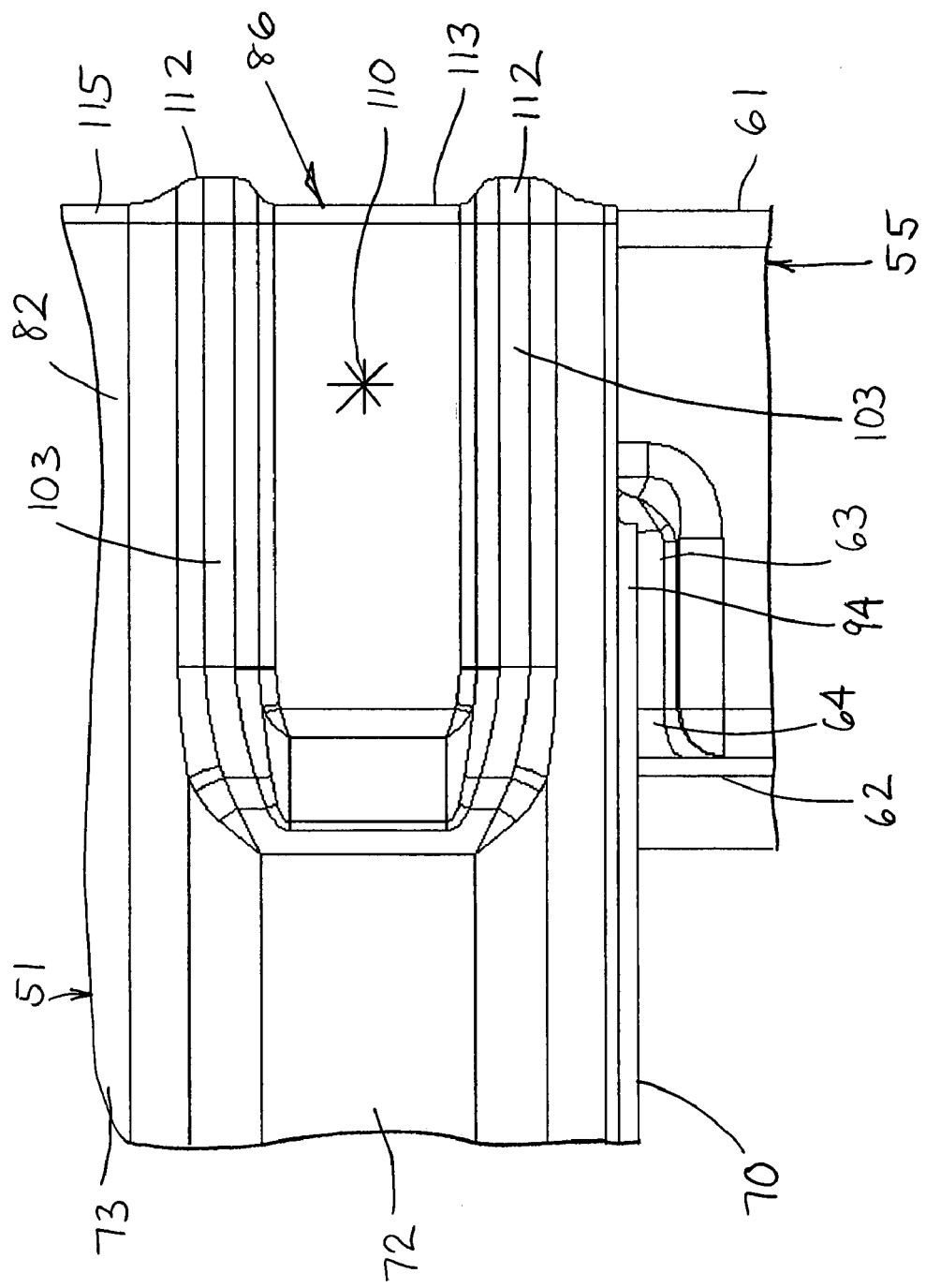
FIG. 21 is a plan view thereof.

More particularly, the side flange 68 has a flange edge 88 that extends horizontally and then transitions upwardly at an angle portion 89 to thereby define a reduced height flange section 90. This reduced height flange section 90 terminates at an end edge 91 that then extends vertically to a bed edge portion 92 extending rearwardly along the bottom plane of the bed member 51. This edge portion 92 then transitions vertically downwardly to a downward leg 93 that is configured to lie close to or against the opposing face of the side sill wall 61. With this construction, the reduced height flange section 90 thereby defines a locator flange designated by additional reference numeral 94, with such flange 94 being provided on each of the opposite side edges 68 and 69 of the bed member 51. Such flanges 94 are each configured to fit into the respective recesses 63 formed in the rear sill 55 as generally seen, for example, in FIGS. 14 and 21 and terminate in the recess 63 close to the opposing recess surface. These flanges 94 are able to generally locate the bed member 51 at the proper location along the lateral length of the rear sill 55 and could be welded to the recess wall if desired to increase the strength of the bed sill connection.

To greatly rigidify the rear bed edge 66, the aforementioned channels 85 are formed in each of the ribs 72 and at least the rear end portion thereof. It will be understood that such channels 85, if desirable, could be provided along the front bed edge 67 with the front sill 52 being thereby modified in accord with the rear sill 55.

Figure 17:
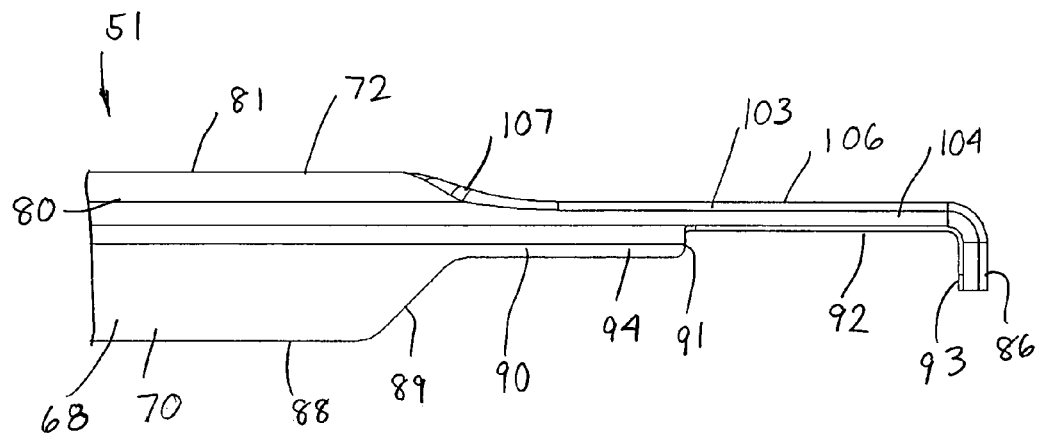
FIG. 17 is an enlarged fragmentary side view of the rear corner in solid outline.
Figure 18:
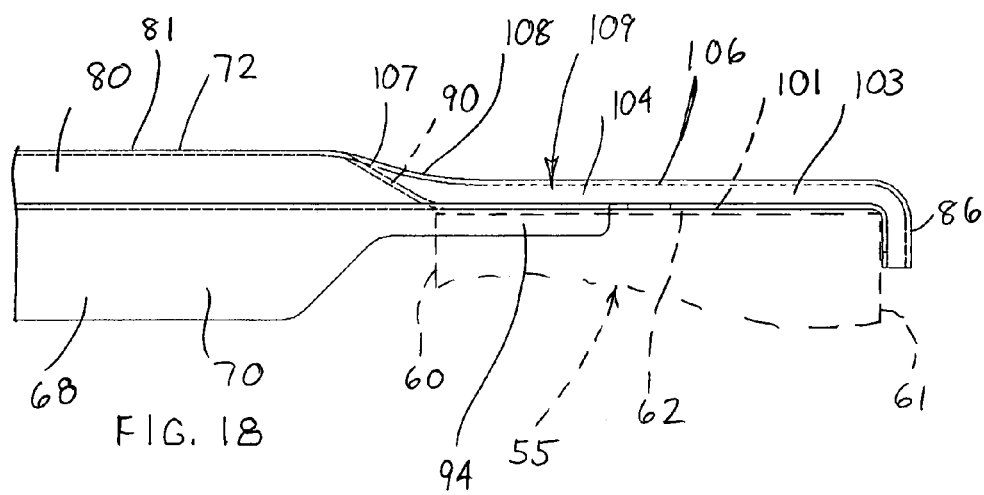
FIG. 18 is an enlarged fragmentary side view of the rear corner illustrating the central channel of the rib.

More particularly as to the rear bed edge 66, such channels 85 as illustrated in FIGS. 15-19 are preferably formed centrally within each respective rib 72 along the central portion thereof but only across a partial width of the rib 72 as defined between the rib side walls 80. The channels 85 are typically formed after the roll-forming process in a stamping station which stamps such formations by pressing the ribs 72 of the initial bed member. Structurally, each channel 85 is defined by a sloped interior end portion 100 that transitions downwardly from the top rib wall 81 and curves rearwardly and transitions into a bottom channel wall 101. Essentially the sloped channel wall 100 and the bottom channel 101 are defined by the roll-formed sheet material which initially formed the endmost portion of the top rear wall 81, which material is then stamped or pressed downwardly and shaped into the sloped channel wall 100 and bottom channel wall 101 so as to have the cross-sectional profile as best illustrated in FIG. 18. It is noted that the respective side boundary edges 100A and 101A of the respective sloped channel wall 100 and bottom channel wall 101 are spaced inwardly from the outermost side extent 80A (FIG. 16) of the side rib walls 80. As a result, the endmost portion of the rib 81 is re-formed into a separated pair of side ribs 103 which are defined by the remnants of the roll-formed rib walls 80 in this region. These side ribs 103 are defined by outer wall portions 104 which are the lengthwise extensions of the side rib walls 80 prior to the stamping process. Each side rib 103 is further defined interiorly by an interior rib wall 105 that is spaced interiorly or inwardly of the outer rib wall 104 yet joined together with the respective outer rib wall 104 by a top rib wall 106.

It is noted as seen in FIGS. 17 and 18 that these side ribs 103 have a vertical height which is approximately half of the distance of the full-height rib 72. In the region of the sloped channel wall 100, the side walls 80 of the rib 72 transition longitudinally through a tapered wall portion 107 which defines tapered rib segments 108 that extend along the boundary edges 100A of the sloped channel wall 100 such that this tapered rib segment 108 has a progressively increasing thickness as compared to the sloped channel wall 107 as seen in FIG. 18 yet decreases in height. As such, this tapered rib segment 108 transitions from the full rib height of the rib 72 to the reduced height of the side ribs 103. Longitudinally past this rib segment 108, the side ribs 103 are provided with a substantially constant vertical height along the longitudinal length thereof with a channel-defining recess 109 being formed between a respective pair of side ribs 103. In this manner, these side ribs 103 define reduced-height extensions of the respective rib 72 such that strengthening ribs, whether a single full-height rib 72 or an associated pair of reduced height ribs 103, thereby extend along the entire longitudinal length of the bed member even though the sloped channel wall 100 is spaced inwardly from the rear terminal bed edge 66.

Referring to FIG. 18, these channels 85 are formed so as to extend across the front-to-back width of the rear sill 55 with the bottom channel wall 101 being disposed in direct contacting relation with the opposing upward facing surface of the top sill wall 62. With this direct contact, the channel 85 is still directly supported by the rear sill 55 while the rib segments 103 extend across the width of the rear sill 55 and maintain the rigidity and strength of the overall bed member 51 in this sill region. Preferably, the sloped channel wall 107 has the bottom or rearmost edge thereof located directly or closely adjacent to the sill side wall 60 as seen in FIG. 18 to thereby prevent dirt and debris from moving rearwardly past this sloped channel wall 107. It is noted that while the side ribs 103 still open longitudinally, forwardly past this sill wall 60, the size of the space defined between the top rib wall 106 and the top sill wall 62 is greatly minimized so as to thereby minimize the open space through which such dirt and debris might enter the gap between the rear sill 55 and the bed member 51.

A distinct advantage associated with the formation of such ribs 103 is the ability of such ribs 103 to minimize the formation of wrinkles as a result of the deformation step such as by stamping, to provide an improved aesthetic appearance to the bed member 51. In particular, the ribs 103 and respective bottom channel wall 101 are formed from the sheet material used to initially form the endmost portions of the rib side walls 80 and the rib top wall 81. This initial material is then reformed after roll-forming into the reduced-height side ribs 103. The overall shape of the side ribs 103 including the tapered rib segments 108 is selectively designed so as to take up and use most of the original rib material existing in the rib side walls 80 and top wall 81 prior to re-forming. This original rib material is reformed with the lowermost portion of the rib side walls 80 still being used to define the outer rib walls 104 and the remainder of the side wall material being used to define the rib top wall 106 and interior side walls 105 and the material then continues into the channel walls 100 and 101 through the use of any excess side wall material from the side walls 80 as well as primarily from the top wall material initially present in the rib top wall 81. As generally illustrated in FIGS. 17-19, the side ribs 103 preferably have an overall height which is approximately one-half of the initial height of the ribs 72 wherein the combined amount of material used to form the rib walls 104, 105 and 106 generally corresponds to the initial material used for the side walls 80. In this manner, wrinkling caused by excess materials resulting from the stamping process may be greatly minimized if not eliminated, while also resulting in a structural rigid rear edge region for the bed member 51.

Furthermore, the channels 85 also provide for increased contact area with the rear sill 55 and provide for substantially increased rigidity in the interconnection between the bed member 51 and the rear sill 55, which interconnection is accomplished typically by welding.

Figure 23:
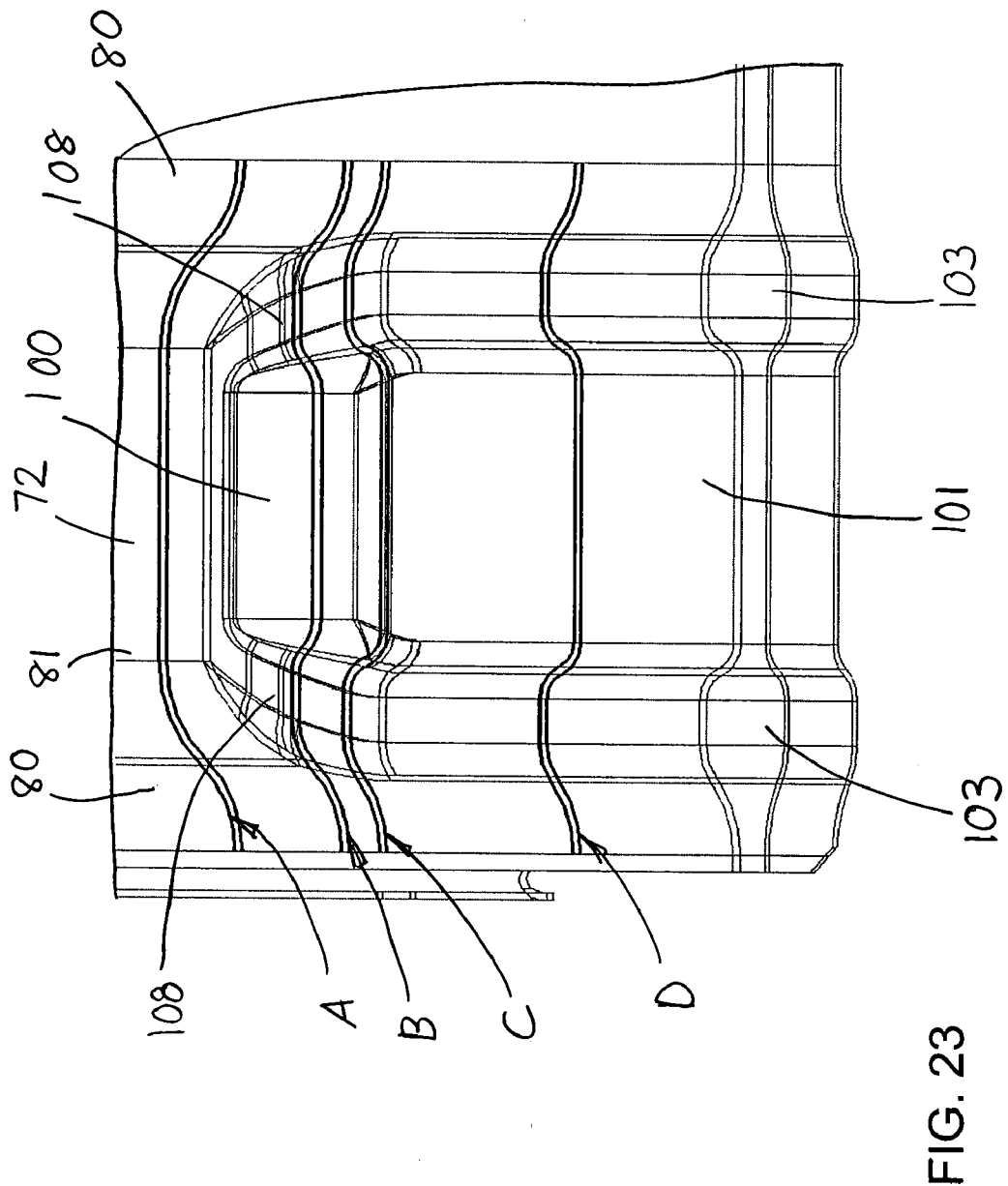
FIG. 23 is an enlarged fragmentary perspective view of the bed member having contour lines illustrated thereon.

To further illustrate this point, FIG. 23 illustrates contour lines A, B, C and D extending across various locations of the end channel area. First as to contour line A, this contour line extends across the surface of the full-height rib 72 and specifically over the rib side walls 80 and rib top wall 81. The length of contour line A indicates the initial amount of sheet material post roll-forming but prior to re-forming with the channels. An exemplary length for this contour A would be 84.747 mm.

After re-forming, the contour lines B, C and D have lengths which preferably are very close to the material length of contour A. As to contour line B, this line extends across the sloped channel wall 100 and the tapered rib segments 108 near the middle thereof. Contour line C is proximate thereto but located near the bottom of the sloped channel wall 100. Exemplary dimensions for these contours are 84.248 mm and 85.596 mm respectively. The shorter length of contour B would indicate excess material being generated, albeit quite small, although the longer length of contour C allows for the take-up of such excess material such that wrinkling is still minimized if not avoided in this region.

The middle of the channel 85 has the contour line D extending across the channel side ribs 103 and bottom channel wall 101, which contour D has an exemplary length of 84.726 mm that is closely proximate the original contour A and thereby indicates that minimal excess material is generated if at all during stamping. By selectively designing the overall contour of the rib 72 and associated end channel 86, excess material can be greatly minimized during the re-forming operation.

Figure 22:
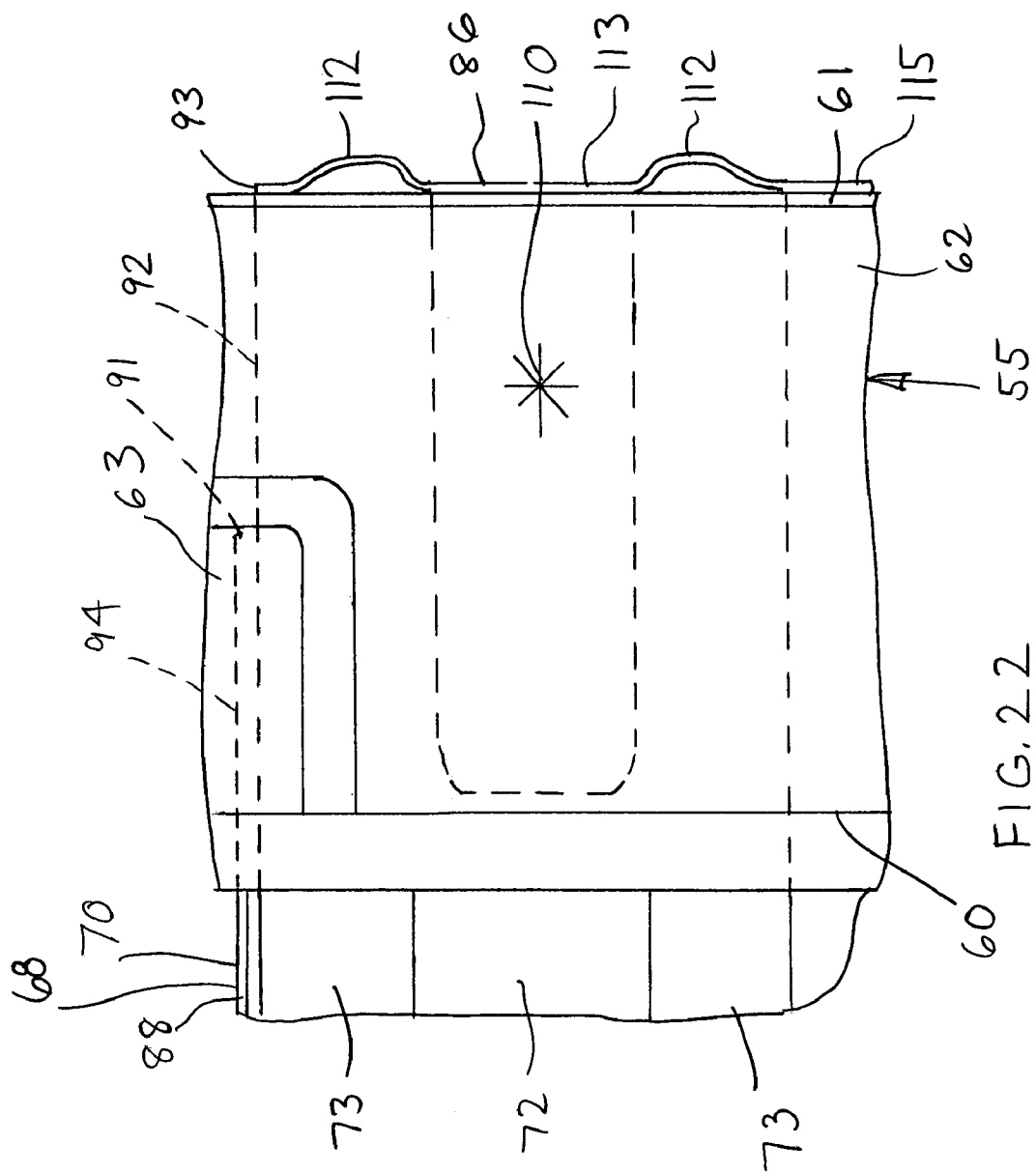
FIG. 22 is a bottom view thereof.

To support the bed member 51 on the sill 55, the bottom channel walls 101 of each of the channels 85 are not only arranged coplanar with each other, but also arranged coplanar with the bottom walls 82 of the valleys 73 such that the bottom channel walls 101 and valley walls 82 lie coplanar in the bottom plane of the bed member 51. As such, all of these walls have downwardly facing flat surfaces which directly contact the opposing upper face of the upper sill wall 62. This provides additional contact area across the lateral width of the bed member 51 wherein each contacting wall also defines a weld location for spot welding of the bed member 51 to the rear sill 55. In particular, these weld locations are indicated by reference numerals 110 in FIGS. 14, 21 and 22. As compared to prior art bed constructions, the bed construction of the invention provides an increased number of weld locations and typically will provide double the number of weld locations previously permitted on a flat planar sill surface. Therefore, in addition to the increased rigidity provided by the side ribs 103, the bed construction of the invention also provides increased strength and rigidity due to the increased number of weld locations 110 and hence, the bed assembly 50 more readily accommodates increased bed loads as opposed to prior art bed constructions.

Figure 15:
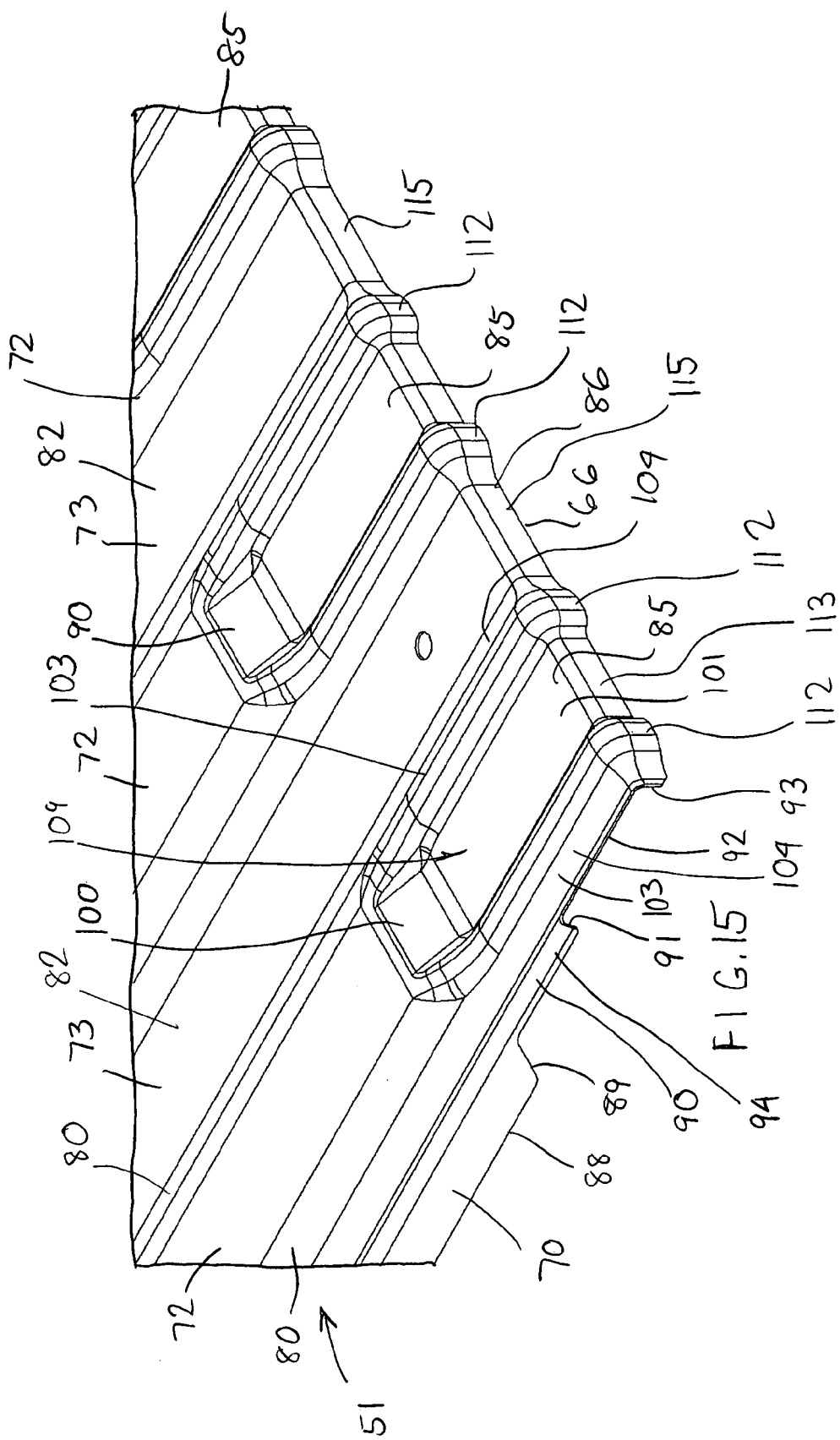
FIG. 15 is an enlarged fragmentary perspective view of a rear edge of the bed member.
Figure 16:
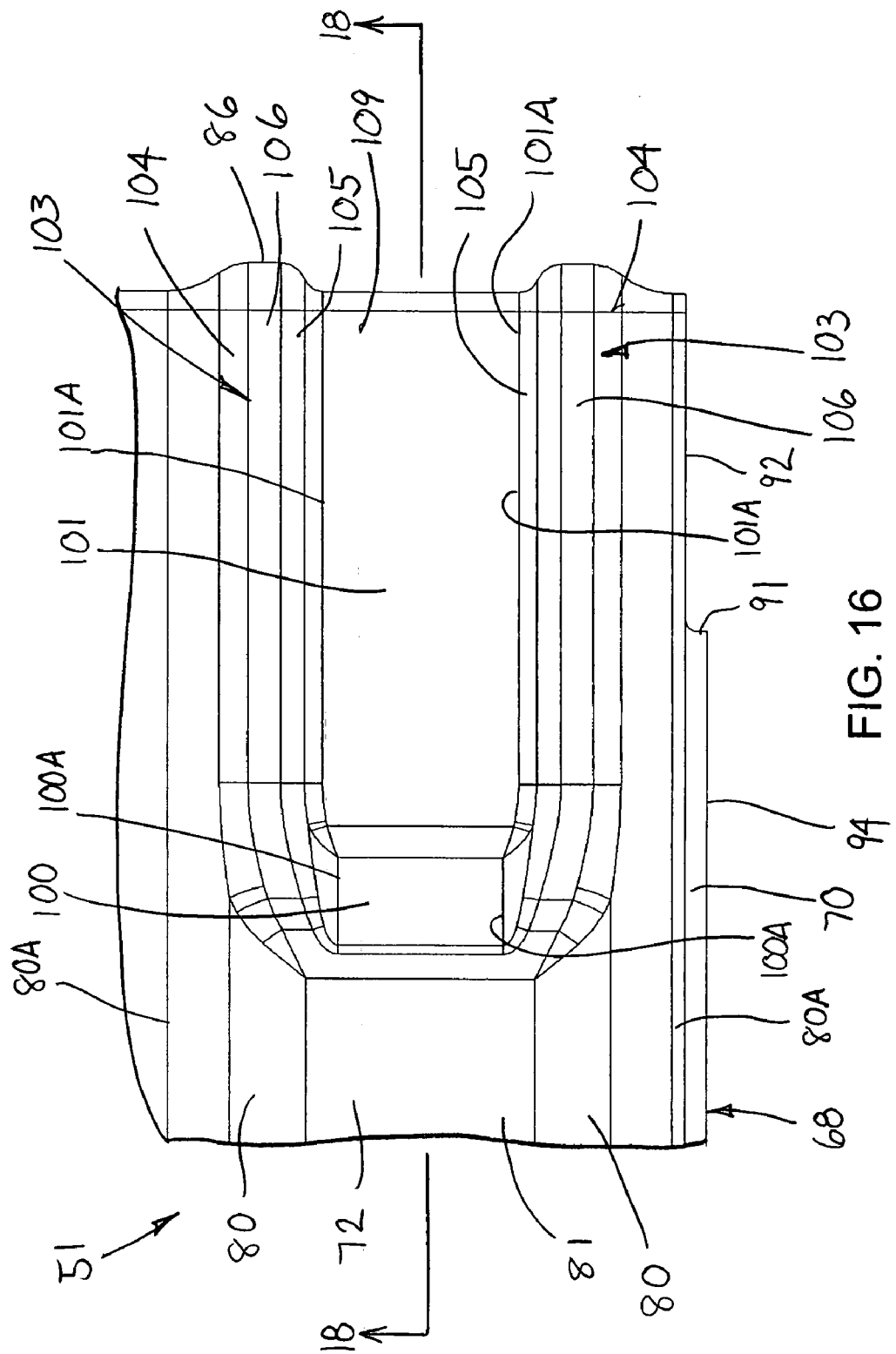
FIG. 16 is an enlarged fragmentary top view of the rear corner.

In addition to the foregoing, the preferred bed member 51 also is re-formed, preferably during the stamping process, so as to include the downwardly depending end flange 86 as seen in FIGS. 17-19. This end flange 86 defines the rearmost edge 66 of the bed member 51 and preferably is formed by shaping the end portion of the bed member 51 so as to form a right-angle, downwardly directed corner. In the preferred embodiment, the edge flange 86 preferably is formed after or during the formation of the side ribs 103, which side ribs 103 as seen in FIG. 15 each transition through a right-angle corner into a downwardly extending rib portion 112. These downwardly extending rib portions 112 have the same cross-sectional profile as the horizontal side ribs 103 and are separated from each other by a flat, downwardly extending channel wall section 113 which is oriented so as to abut against and in opposing relation with the rearward facing surface of the sill side wall 61. By transitioning the side ribs 103 into the vertical rib portions 112, the edge flange 111 thereby has an increased structural strength as opposed to prior art flange constructions which did not include any ribbing and were formed essentially planar and at a right angle with a corresponding plane or surface of the horizontal portion of a bed member.

Figure 20:
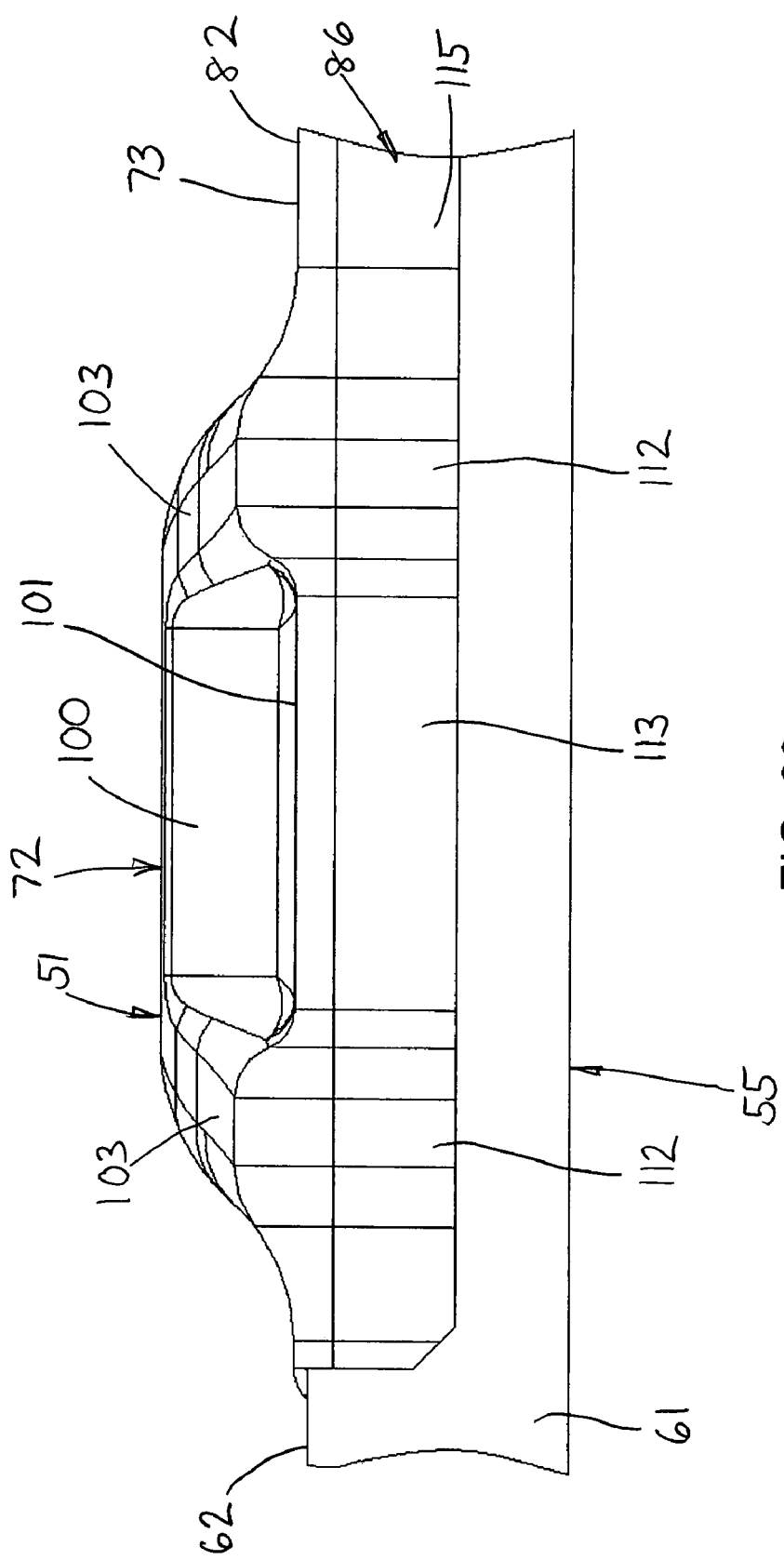
FIG. 20 is an enlarged fragmentary end view of the bed member mounted on a rear sill.

In the region of this edge flange 86, the edge flange 86 extends continuously across the width of the bed member and as such, the bottom wall 82 of each valley is bent downwardly and defines a downwardly extending wall segment 115, which wall segment 115 is disposed between a respective pair of the rib segments 112. In this manner, the edge flange 86 serves to wrap downwardly over the upper, rearmost corner of the rear sill 55 which provides additional rigidifying support to the joint between the bed member 51 and the rear sill 55. In FIG. 14, it is noted edge flange 86 has a relatively short vertical dimension while a greater vertical dimension also may be provided as seen in FIG. 20.

To manufacture the aforementioned bed assembly 50, flat sheet steel is passed through the roll-forming station to initially form the parallel ribs 72 and valleys 73, and define a continuous, corrugated, roll-formed sheet member which then is cut to length at an appropriate cutting station to form the bed member. Thereafter, the bed member 11 is re-formed, preferably in a stamping station, to form the above-described channels 85 with the specific profile illustrated and described herein. Thereafter, the bed member 51 is mounted to the rear sill 55 with the rear bed flange 86 fitting over and abutting against the sill side wall 61. In this position, the bottom channel walls 101 and the bottom valley walls 82 are in direct, downward facing, contacting relation with the upper sill wall 62, and after positioning thereon, such wall sections 101 and 73 are spot welded to the associated top sill wall 62 at each weld location.

With this bed construction, an improved bed assembly 50 is provided which has a substantially increased load-bearing capacity and structural rigidity as opposed to known bed constructions. This makes the bed assembly 50 and the bed member 51 thereof particularly suited for heavy-duty vehicles such as heavy-duty pickup trucks and the like.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A vehicle bed construction comprising a bed member which comprises a monolithic one-piece bed member constructed of thin sheet-like metal, said bed member having a plurality of elongate, upwardly projecting full-height ribs formed therein in sidewardly spaced relation so as to be separated by valleys therebetween, said ribs and said valleys alternating one next to the other and extending longitudinally of the bed member in generally parallel relation so as to terminate adjacent transversely extending front and rear end edges of said bed member, said ribs and valleys being generally uniform along the length thereof wherein said ribs are each defined by spaced first rib side walls which extend upwardly and are joined together by a top rib wall extending sidewardly therebetween and said valleys are each defined by a bottom valley wall extending sidewardly between the spaced side walls of a sidewardly adjacent pair of said ribs, said ribs having a full first height extending along the length of said bed member wherein said ribs at least one end of said bed member include end channels formed therein, each said channel being formed centrally within a respective said rib and extending longitudinally toward said one bed end, said channel comprising a sloped channel wall extending downwardly from said top rib wall and transitioning into a bottom channel wall extending longitudinally to said one bed end, said channel being defined on opposite sides by channel side ribs which form longitudinal extensions of said rib side walls and have a second height which is a portion of said full first height, said channel bottom walls and said valley bottom walls being disposed substantially coplanar with said each other in a bottom plane of said bed member so as to each be supported on a cross sill used in a vehicle to support said bed member.

2. A bed construction according to claim 1, which further comprises a cross sill mountable on a vehicle, said cross sill comprising a flat upper sill wall on which said channel bottom walls and said valley bottom walls are supported in contacting engagement therewith.

3. A bed construction according to claim 2, wherein said each of said channel bottom walls and said valley bottom walls are fixedly secured to said cross sill.

4. A bed construction according to claim 3, wherein each of said channel bottom walls and said valley bottom walls are fixedly secured to said cross sill by welding.

5. A bed construction according to claim 2, wherein said channels and said channel side ribs have a longitudinal length proximate a width of said cross sill.

6. A bed construction according to claim 1, wherein said channels are formed by re-forming of said ribs such that said channel side ribs, said sloped channel wall and said channel bottom wall are formed by the initial material of said ribs with a minimum of material excess.

\* \* \* \* \*